US009941623B2

(12) United States Patent
Lett

(10) Patent No.: US 9,941,623 B2
(45) Date of Patent: Apr. 10, 2018

(54) FLAT ETHERNET CABLES AND ASSOCIATED SYSTEMS, DEVICES, AND METHODS

(71) Applicant: ECHOSTAR TECHNOLOGIES L.L.C., Englewood, CO (US)

(72) Inventor: David B Lett, Duluth, GA (US)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 33 days.

(21) Appl. No.: 14/988,037

(22) Filed: Jan. 5, 2016

(65) Prior Publication Data

US 2016/0197434 A1 Jul. 7, 2016

Related U.S. Application Data

(60) Provisional application No. 62/099,825, filed on Jan. 5, 2015.

(51) Int. Cl.
*H01R 13/52* (2006.01)
*H01R 13/516* (2006.01)
*H04N 5/225* (2006.01)
*H01R 24/64* (2011.01)

(52) U.S. Cl.
CPC ....... *H01R 13/5213* (2013.01); *H01R 13/516* (2013.01); *H04N 5/2251* (2013.01); *H04N 5/2257* (2013.01); *H01R 24/64* (2013.01)

(58) Field of Classification Search
CPC .............. H01R 13/5213; H01R 13/516; H04N 5/2251; H04N 5/2257
See application file for complete search history.

(56) References Cited

U.S. PATENT DOCUMENTS

| 7,484,993 | B2* | 2/2009 | Amidon | H01R 13/5825 439/418 |
| 8,702,440 | B2* | 4/2014 | Nooner | H01R 13/5213 439/279 |
| 9,407,032 | B1* | 8/2016 | Song | H01R 13/5205 |
| 9,413,101 | B1* | 8/2016 | Nooner | H01R 13/5208 |
| 9,483,067 | B2* | 11/2016 | Lonvick | G05B 15/02 |
| 2005/0064752 | A1* | 3/2005 | Serino | H01R 13/622 439/320 |

(Continued)

OTHER PUBLICATIONS

"Cheap RJ45 Cable Best Ethernet Lan Rj45 Network Connector Female Jack Online with $3.06/Piece", from DHgate.com located at URL http://www.dhgate.com:80/store/product/10pcslotethernetlanrj45networkconnector/155765937.html, retrieved from archive.org, publication date of Jan. 18, 2014.*

*Primary Examiner* — Nicholas Giles
(74) *Attorney, Agent, or Firm* — Lorenz & Kopf LLP

(57) ABSTRACT

Flat Ethernet cables and associated systems, devices, and methods are disclosed, particularly as applied to home security system implementations. For example, disclosed herein is a flat Ethernet cable that includes an interior, female connection end, an exterior, female connection end, opposite the interior end, and including a weather-proofing clamshell enclosing the female connection end, and a flat cable portion that runs between the interior end and the exterior end. The flat Ethernet cable is configured as a PoE cable.

4 Claims, 20 Drawing Sheets

(56) References Cited

U.S. PATENT DOCUMENTS

| | | | | |
|---|---|---|---|---|
| 2008/0105452 A1* | 5/2008 | King | ........................ | H02G 3/32 |
| | | | | 174/92 |
| 2009/0233475 A1* | 9/2009 | Mildon | .................. | H01R 9/035 |
| | | | | 439/277 |
| 2013/0165002 A1* | 6/2013 | Nooner | .............. | H01R 13/5208 |
| | | | | 439/892 |
| 2013/0250971 A1* | 9/2013 | Mora | ...................... | G06F 13/00 |
| | | | | 370/467 |
| 2014/0258742 A1* | 9/2014 | Chien | .................... | H04L 12/10 |
| | | | | 713/300 |
| 2015/0052257 A1* | 2/2015 | Mora | ...................... | G06F 13/00 |
| | | | | 709/227 |
| 2015/0168974 A1* | 6/2015 | Mascarenhas | .......... | H04L 12/10 |
| | | | | 700/297 |
| 2015/0186325 A1* | 7/2015 | Petrick | ................. | G06F 13/426 |
| | | | | 710/313 |
| 2015/0301544 A1* | 10/2015 | Lonvick | ................. | G05B 15/02 |
| | | | | 700/297 |
| 2015/0325945 A1* | 11/2015 | Ramos | ............... | H01R 13/5221 |
| | | | | 439/589 |
| 2016/0365666 A1* | 12/2016 | Ramos | ............... | H01R 13/5221 |

\* cited by examiner

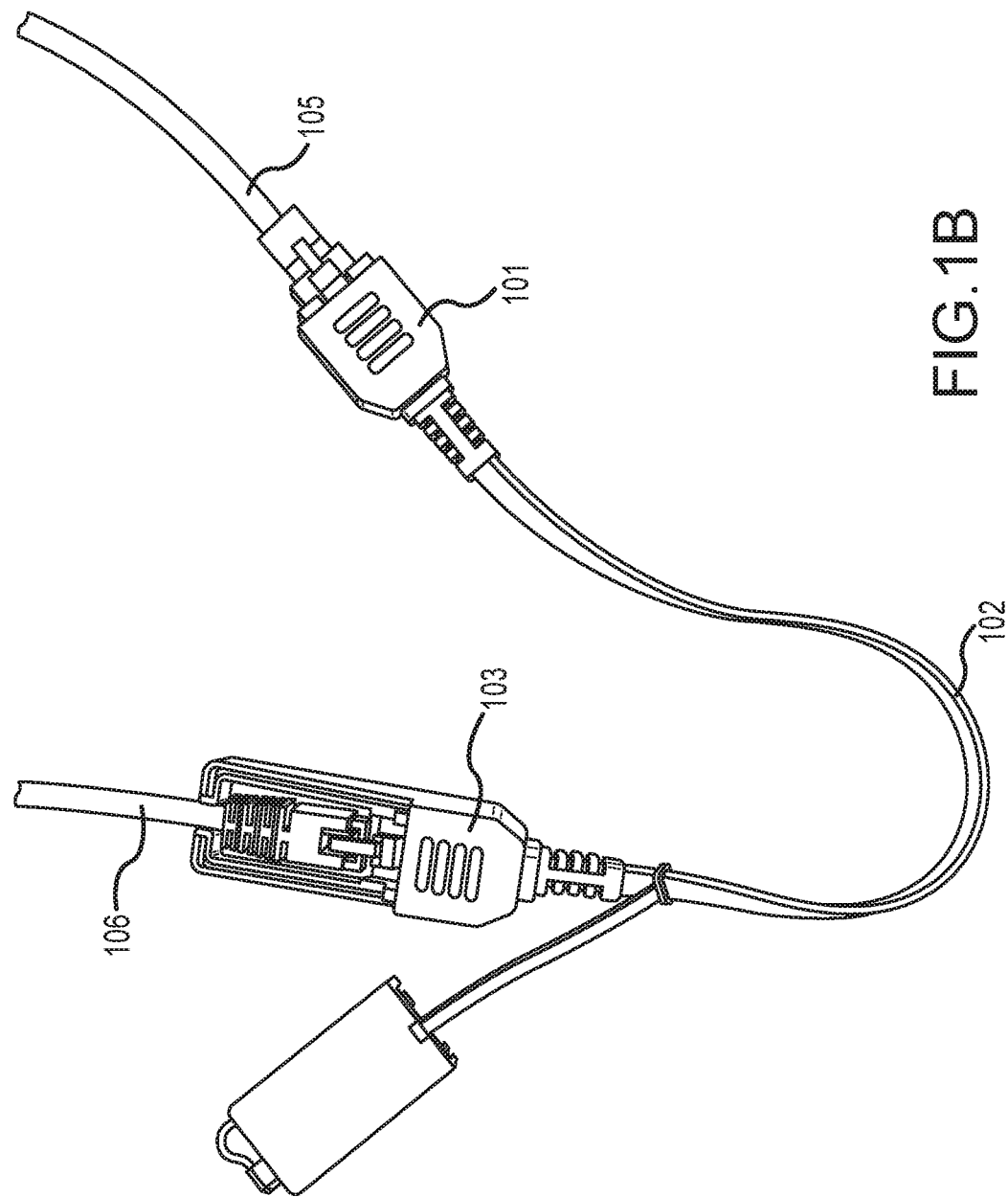

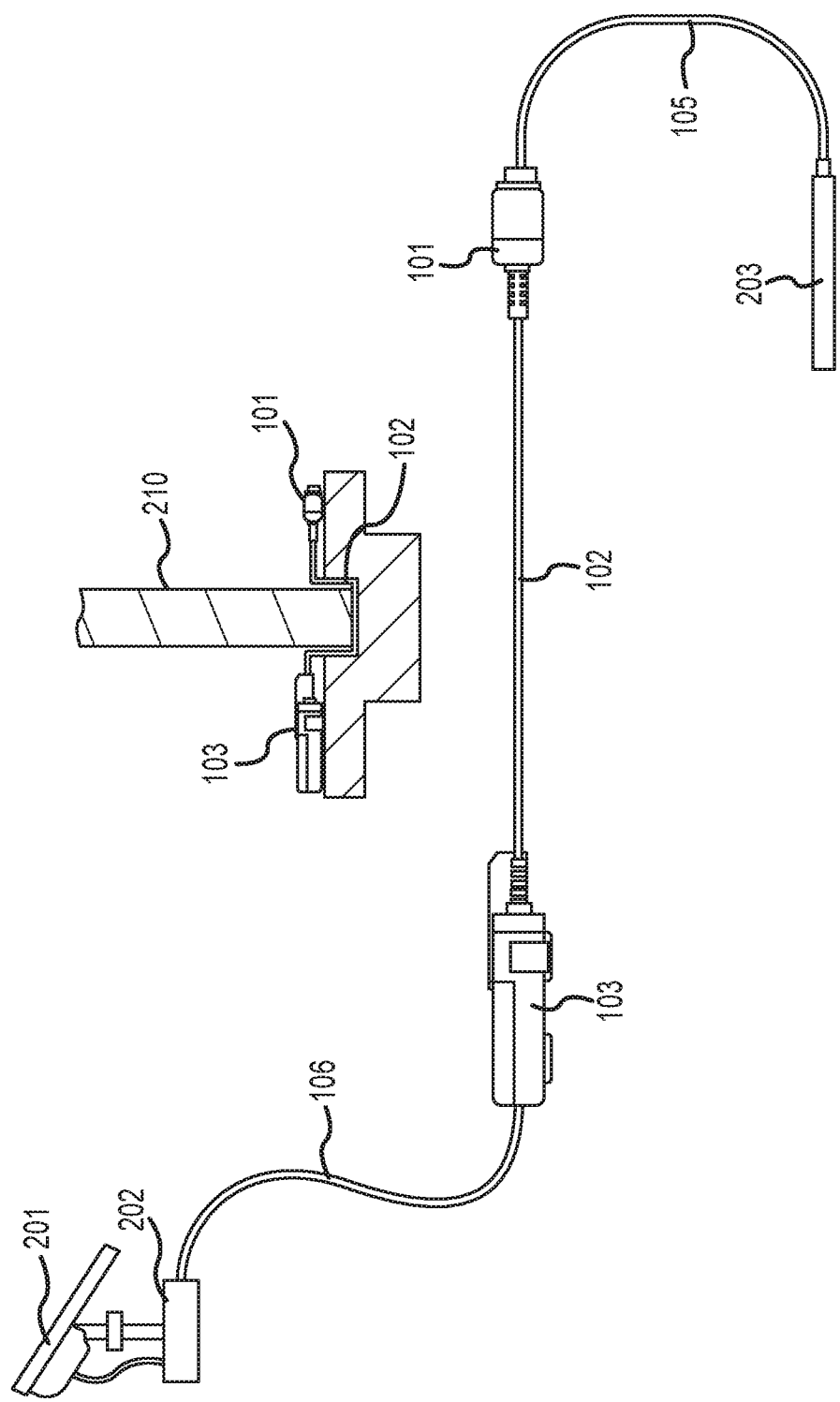

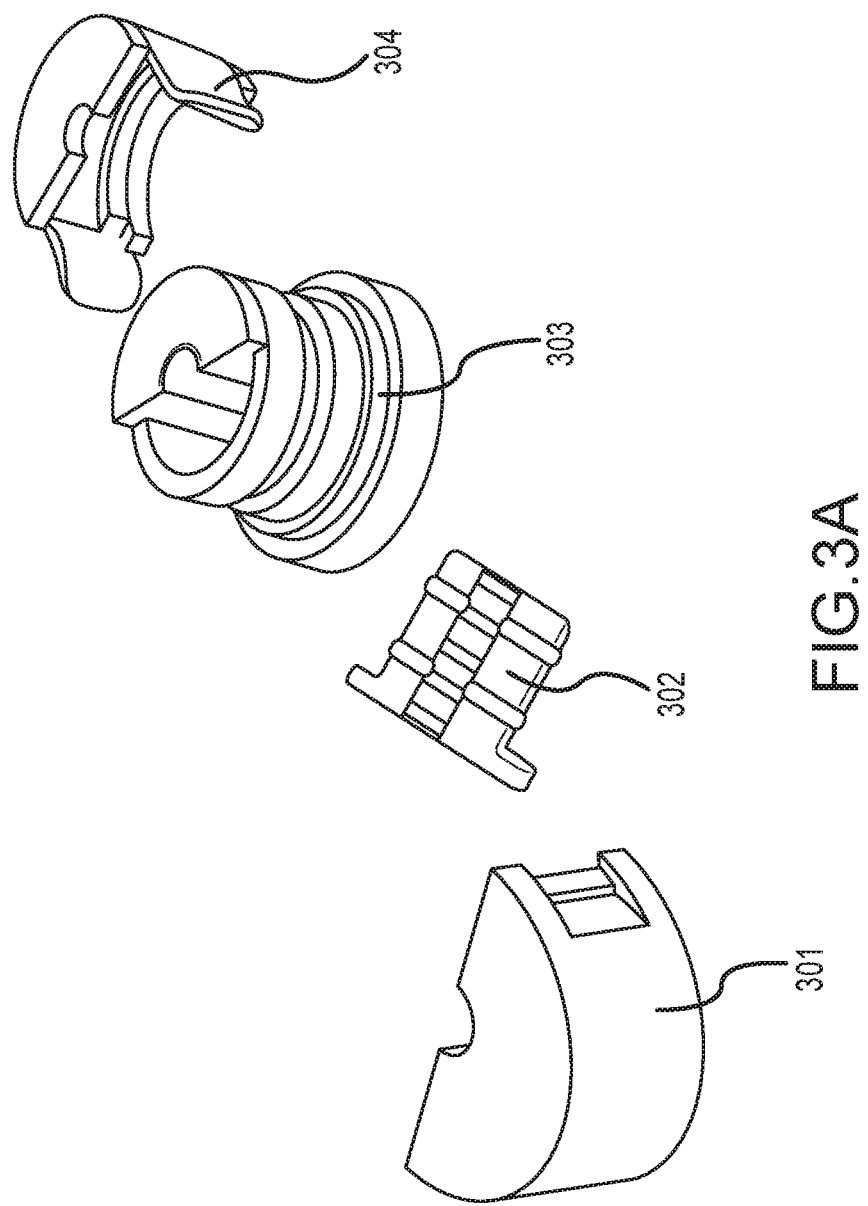

301/302/303/304

FLAT ETHERNET CABLES AND ASSOCIATED SYSTEMS, DEVICES, AND METHODS

CROSS-REFERENCE TO RELATED APPLICATION

This application claims the benefit of priority to U.S. Provisional Patent Application Ser. No. 62/099,825, filed on Jan. 5, 2015, the contents of which are herein incorporated by reference in their entirety.

TECHNICAL FIELD

The present disclosure relates generally to data cables and associated systems, devices, and methods. More particularly, the present disclosure relates to flat Ethernet cables and associated systems, devices, and methods, particularly as applied to home security system implementations.

BACKGROUND

Communications networks are commonly used to enable end devices such as computers, servers, cameras, memory devices and the like to communicate with each other and/or to communicate with remote devices via one or more external telecommunications links. These networks include, among other things, communications cabling and connectors (also referred to herein as "connector ports") that are used to interconnect the end devices, as well as network switches and routers that are used to route communications between the end devices. The network switch routes data signals that are transmitted from the end device toward their intended destinations (e.g., to other end devices, an external network, etc.), and likewise routes incoming data signals to the end device, as appropriate.

In many networks, each communications cable in the network includes eight insulated conductors such as copper wires that are arranged as four pairs of conductors, where the two conductors of each pair are tightly twisted together. Such cables are commonly referred to as "Ethernet" cables. Differential signaling techniques may be used to transmit a single information signal over each pair of conductors (referred to herein as a "differential pair" or simply as a "pair") in an Ethernet cable. With differential signalling, the signals transmitted on each conductor of the differential pair have equal magnitudes, but opposite phases, and the information signal is embedded as the voltage difference between the signals carried on the two conductors of the pair. Each of the four twisted pairs are then encased within an outer jacket that is made of a flexible plastic or polymer material. The outer jacket generally has a circular cross-section within which the four twisted pairs are encased. The circular cross-section is generally preferred due to the minimization of dimensions occupied by the four twisted pairs of wires.

Security systems employing cameras have long been used by businesses and other organizations as a way to provide security and privacy. In many cases, security systems are not an easy add-on to a home. As a result, most security systems that use cameras are too complex and expensive for a user to implement in a home setting. Additionally, many aftermarket security systems are not easily integrated into a home without appearing out-of-place or creating a poor aesthetic. Home security is particularly important when the user needs to answer the doorbell, has small children, or is away from the home temporarily or for extended periods of time. Existing security systems are not easily integrated and do not allow efficient access to security content in or away from the home. For example, using conventional Ethernet cables that have a generally circular cross-section for purposes of providing data and electrical connectivity to a home security camera, it is typically necessary to drill a hole in the home's wall at the camera installation location for feeding the Ethernet cable through.

As such, there is a continuing need in the art for systems and methods that allow for improved installation of Ethernet-enabled home security cameras. Moreover, other desirable features and characteristics of the present disclosure will become apparent from the subsequent detailed description the appended claims, taken in conjunction with the accompanying drawings and background.

BRIEF SUMMARY

The various embodiments disclosed herein relate to flat Ethernet cables and associated systems, devices, and methods, particularly as applied to home security system implementations. In one embodiment, disclosed herein is a flat Ethernet cable that includes an interior, female connection end, an exterior, female connection end, opposite the interior end, and including a weather-proofing clamshell enclosing the female connection end, and a flat cable portion that runs between the interior end and the exterior end. The flat Ethernet cable is configured as a PoE cable. In variations of this embodiment, the flat cable portion includes two parallel planar width sides that are greater in dimension than a thickness of the flat cable portion.

In another embodiment, disclosed herein is a security camera system that includes an IP camera, a mounting/positioning apparatus connected to the IP camera that physically connects the IP camera to a building structure at an exterior portion of the building structure, a first, exterior Ethernet cable connected to the IP camera at a first end thereof and that runs through or along the mounting/positions apparatus, and a flat Ethernet cable. The flat Ethernet cable includes an interior, female connection end, an exterior, female connection end, opposite the interior end, and including a weather-proofing clamshell enclosing the female connection end, and a flat cable portion that runs between the interior end and the exterior end. The flat Ethernet cable is configured as a PoE cable. The first Ethernet cable has a second end that connects to the exterior connection end of the flat Ethernet cable. The flat Ethernet cable runs through a closed window of the building structure between a rail portion and a jamb portion of the closed window. The system further includes a second, interior Ethernet cable that connects to the interior connection end of the flat Ethernet cable at a first end thereof and at an interior portion of the building structure, a WiFi bridge that is electrically connected to an interior power outlet of the building structure and that is connected to the second, interior Ethernet cable at a second end thereof, and a wireless router that wirelessly connects with the WiFi bridge for the transmission of data between the wireless router and the WiFi bridge. In variations of this embodiment, the mounting/positioning apparatus connects to the window of the building structure using a hanger device and/or the first, exterior Ethernet cable connects to the IP camera using a stopper device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE FIGURES

The disclosed embodiments will hereinafter be described in conjunction with the following drawing figures, wherein like numerals denote like elements, and wherein:

FIGS. 1A-1C shows exemplary implementations of a flat Ethernet cable;

FIGS. 2A-2C show exemplary implementations of a home security camera system using the flat Ethernet cable of FIGS. 1A-1C;

FIGS. 3A-3D show an exemplary stopper device useful in the home security camera system shown in FIGS. 2A-2C;

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1A:
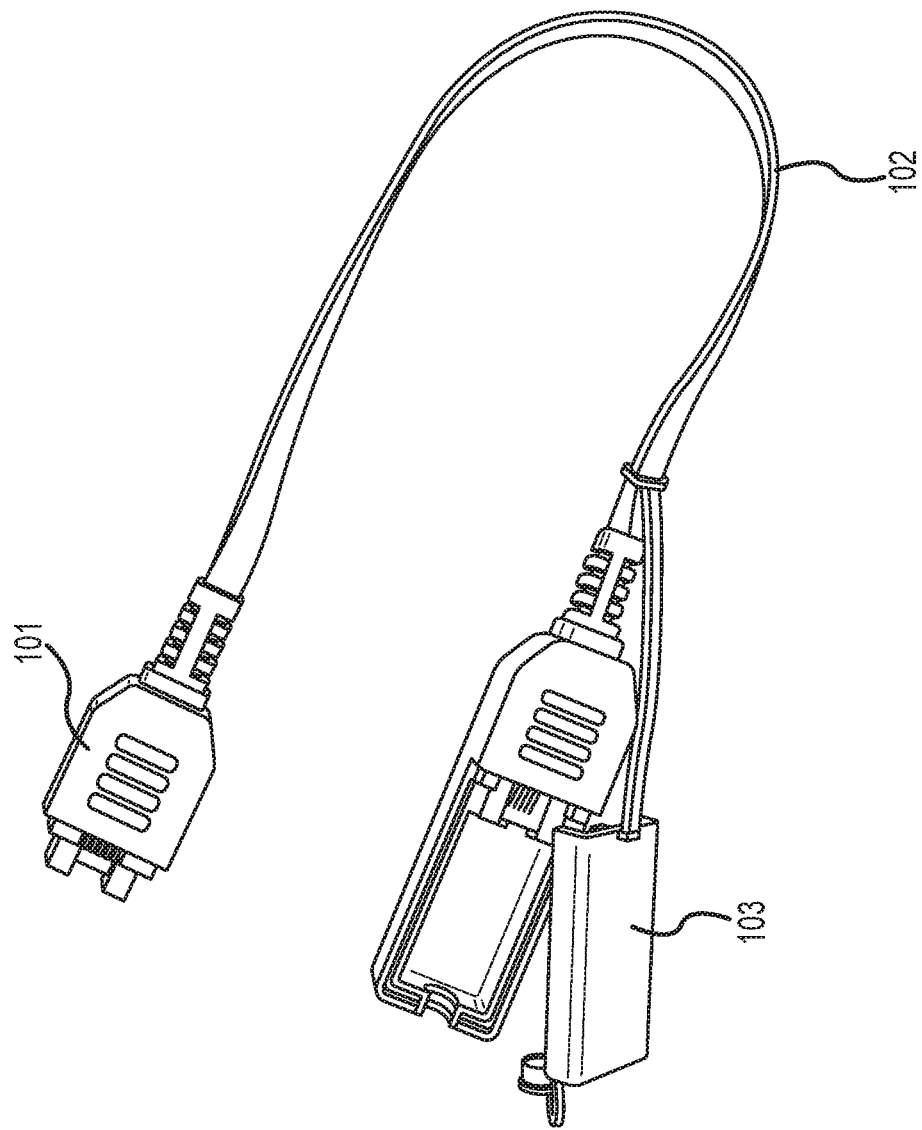
Figure 1C:
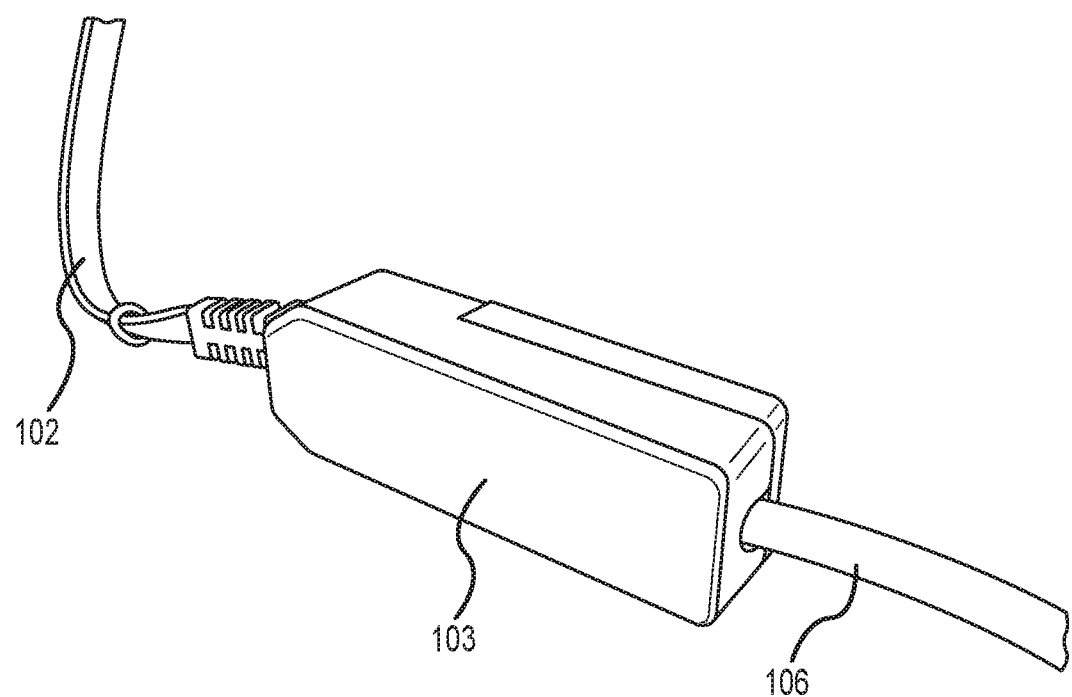
Figure 1D:
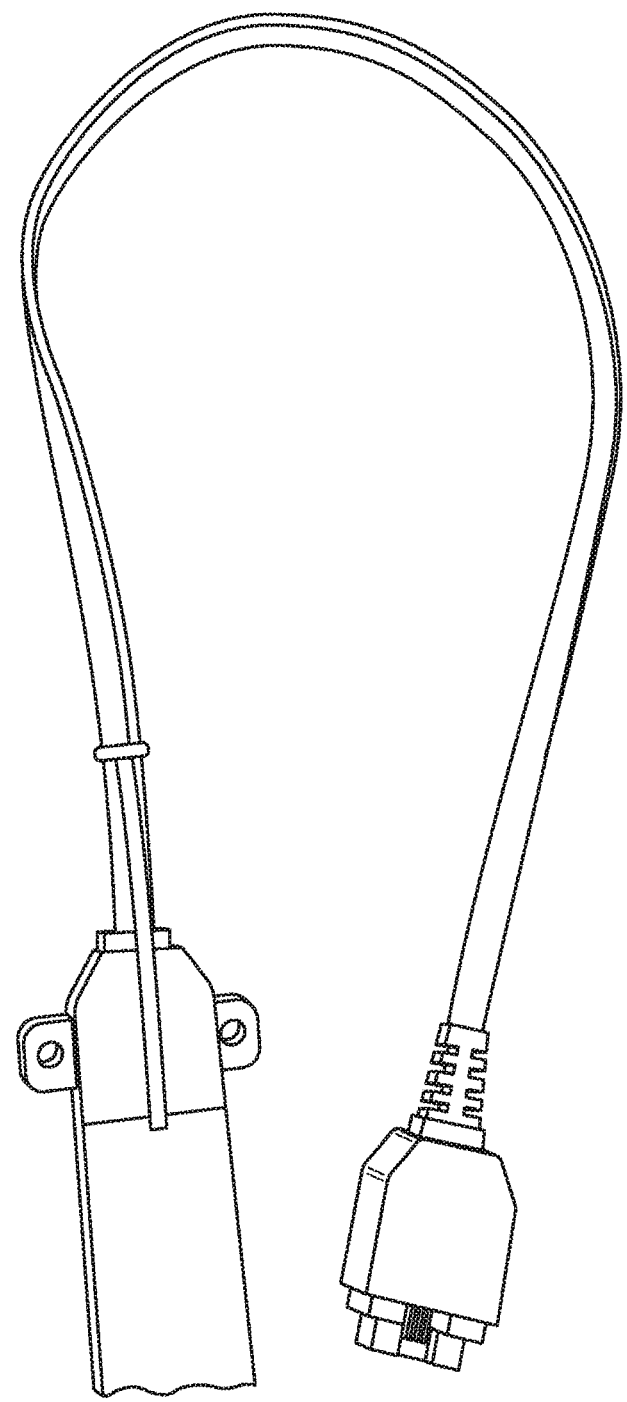
FIGS. 1D-1F show exemplary alternative implementations of a flat Ethernet cable.
Figure 1E:
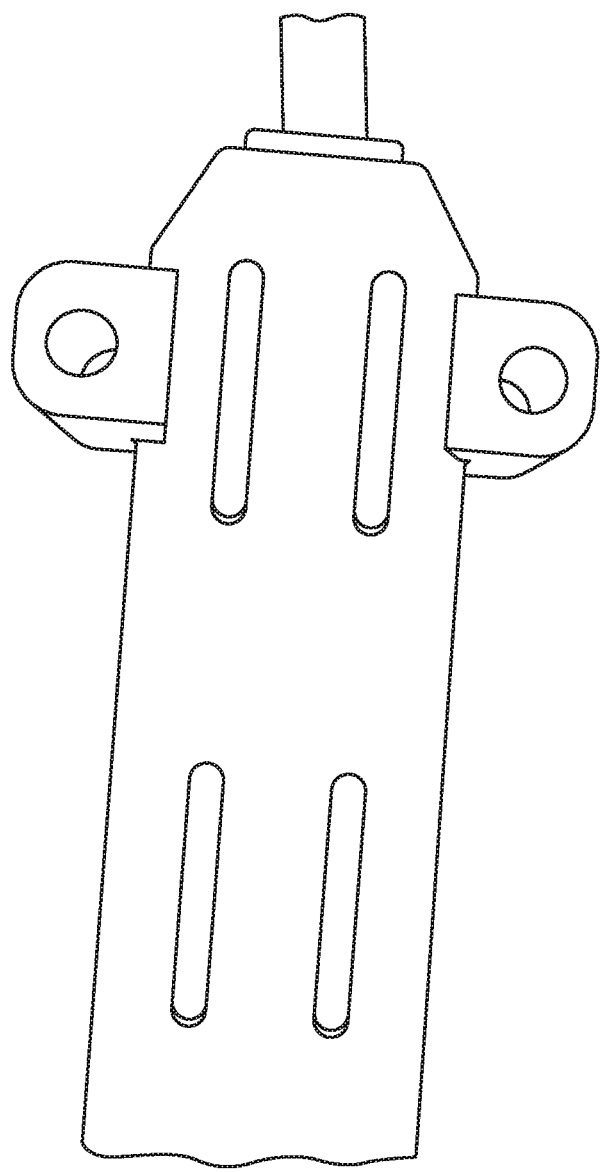
Figure 1F:
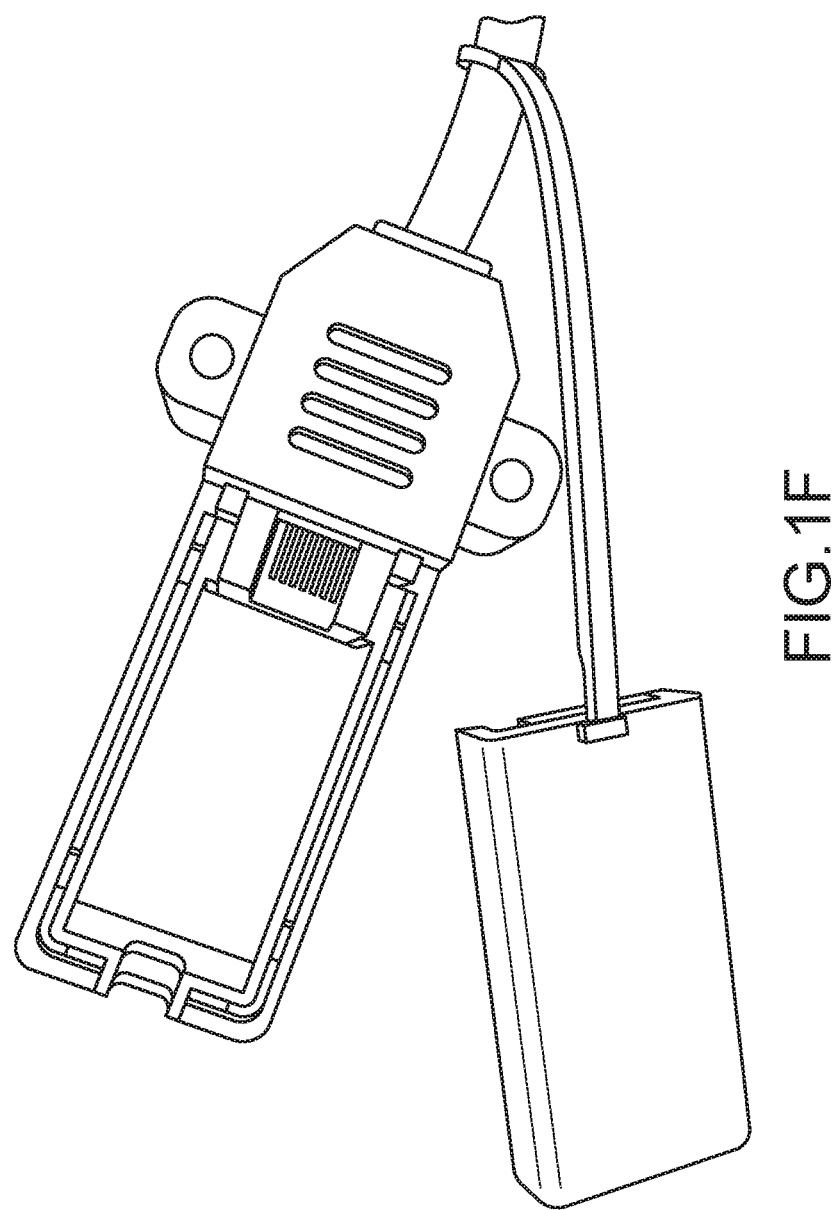
Figure 1I:
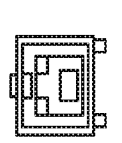
FIGS. 1G-1I are schematics of the alternative implementations of the flat Ethernet cable of FIGS. 1D-1F.
Figure 1G:
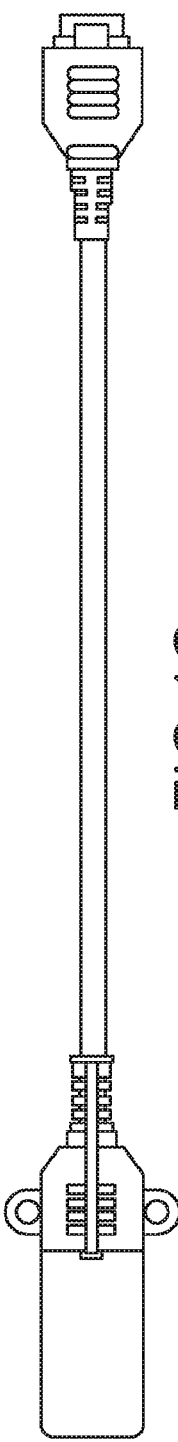
Figure 1H:
Figure 4:
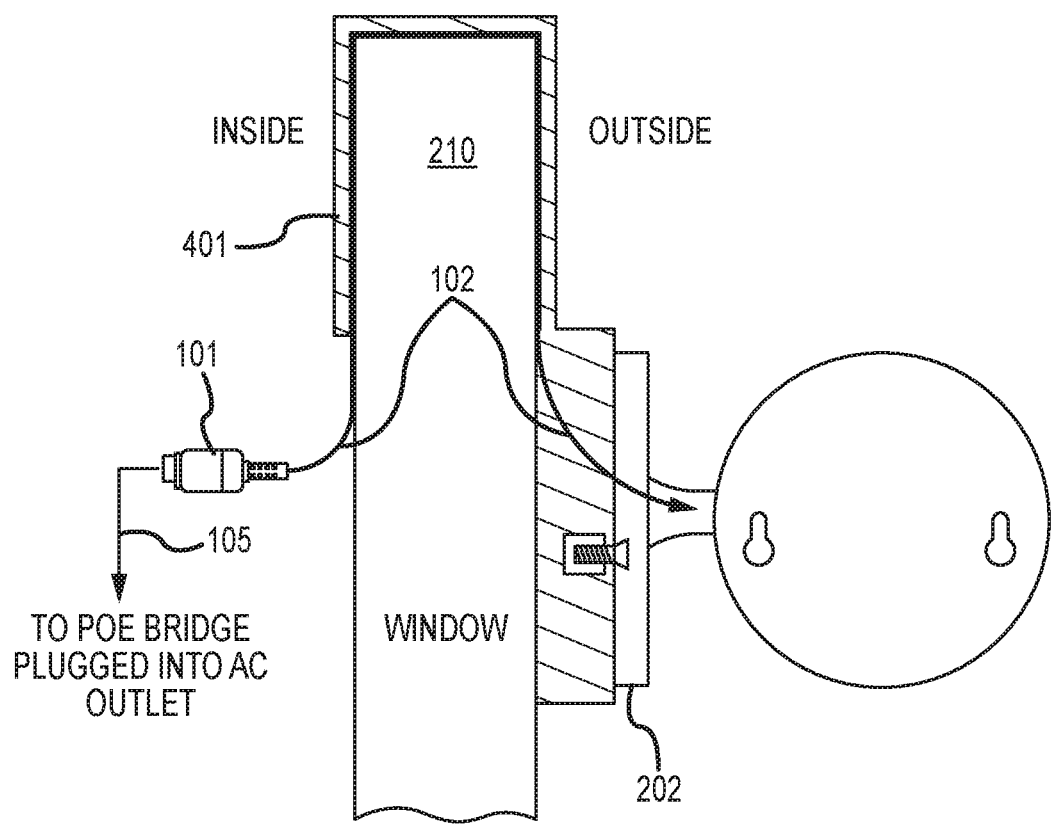
FIG. 4 shows a hanger device useful in the home security camera system shown in FIGS. 2A-2C.
Figure 4:
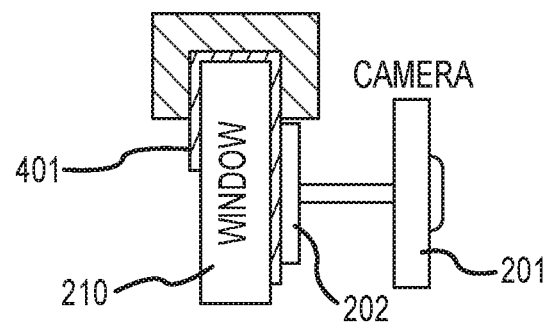

Embodiments of the present disclosure are generally directed to flat Ethernet cables and associated systems, devices, and methods, particularly as applied to home security system implementations. While a "home" security implantation is described herein, the disclosure is readily extendable to other security camera implementations, such as business, commercial, or other implementations on buildings that have exterior windows. In an embodiment, a home security camera is installed on an exterior portion of a user's house. A first Ethernet cable is provided and configured to provide both data connectivity and electrical connectivity to the camera. A stopper device as shown in FIGS. 3A-3D allows removing the first Ethernet cable that comes with the camera and changing to different colors/lengths of the first Ethernet cable without having to install Ethernet connectors. The home security camera may be mounted and installed in the vicinity of an exterior window of the house using the hanger device as shown in FIG. 4. The first Ethernet cable is connected to a flat Ethernet cable, as shown in FIGS. 1A-1C, outside of the house. The flat Ethernet cable is configured so as to allow it to be run through an open exterior of the window of the house, and thereafter closing the window over the flat Ethernet cable thus allowing the window to fully close over the flat Ethernet cable and not damaging the flat Ethernet cable or the window. The outside portion of the flat Ethernet cable has a weather-proofing feature. The flat Ethernet cable connects to a second Ethernet cable inside of the house. The second Ethernet cable connects to a WiFi bridge that is plugged into a power outlet of the house for purposes of electrical connectivity, and connects wirelessly to an internet/WiFi router in the house for purposes of data connectivity. The aforementioned home security camera system is shown and described in greater detail in connection with FIGS. 2A-2C. Communication is secure on the outside of the house to block any intruders from accessing the home network by disconnecting the outdoor Ethernet cable from the camera and connecting to their PC. This is accomplished by secure hardware cryptography locking the bridge to the camera. The outdoor portion is powered and sends data over the Ethernet cable. The indoor WiFi bridge has good performance because the WiFi communications is inside the house so that the RF signal does not have to penetrate outside walls.

Turning first to FIGS. 1A-1C, the flat Ethernet cable, which may be considered as a home interior/exterior connector Ethernet cable, is illustrated. In a first aspect, the flat Ethernet cable includes a home interior connection portion 101. The portion 101 is a "female" connection portion, in that it includes an Ethernet connection receptor for a "male" Ethernet cable end of another Ethernet cable 105 (referred to above as the second Ethernet cable). In another aspect, the flat Ethernet cable includes a home exterior connection portion 103. The portion 103 is also a female connection portion, for connection with a male Ethernet cable end of another Ethernet cable 106 (referred to above as the first Ethernet cable). The portion 103 includes a weather "proofing" or "protection feature," which allows the female end thereof, and the male end of cable 106, to be fully enclosed within a hard plastic shell for protection against rain, snow, wind, dust, and any other weather that may be experienced at the exterior of a home that may cause damage to the cable connections. The weather-proofing feature of the portion 103 includes a removable portion of the plastic shell (which also may be referred to as a "clamshell" configuration), that slides or snaps away from an integrated portion of the plastic shell, to allow for removal of the male end of cable 106 from the female end of portion 103. In yet another aspect, the flat Ethernet cable includes a flat cable portion 102 between portions 101 and 103. As used herein, the term "flat cable portion" means that the cable has two parallel planar sides ("widths"), which are greater in dimension than a thickness of the cable, such as two, three, four, or more times greater in dimension. The flatness of the portion 102 enables it to be run through an exterior window of the home, and having the window closed thereupon without damaging the cable or the window.

The cables/cable portions 102, 105, and 106 allow for both data and electrical transmission. In this regard, Power over Ethernet or PoE describes any of several standardized or ad-hoc systems which pass electrical power along with data on Ethernet cabling. This allows a single cable to provide both data connection and electrical power to devices such as wireless access points or IP cameras. Unlike standards such as Universal Serial Bus which also power devices over the data cables, PoE allows long cable lengths. Power may be carried on the same conductors as the data, or it may be carried on dedicated conductors in the same cable. There are several common techniques for transmitting power over Ethernet cabling. Two of them have been standardized by IEEE 802.3. Since only two of the four pairs are needed for 10BASE-T or 100BASE-TX, power may be transmitted on the unused conductors of a cable. In the IEEE standards, this is referred to as Alternative B. Power may also be transmitted on the data conductors by applying a common-mode voltage to each pair. Because twisted-pair Ethernet uses differential signalling, this does not interfere with data transmission. The common mode voltage is easily extracted using the center tap of the standard Ethernet pulse transformer. This is similar to the phantom power technique commonly used for powering audio microphones. In the IEEE standards, this is referred to as Alternative A. In addition to standardizing existing practice for spare-pair and common-mode data pair power transmission, the IEEE PoE standards provide for signalling between the power source equipment (PSE) and powered device (PD). This signaling allows the presence of a conformant device to be detected by the power source, and allows the device and source to negotiate the amount of power required or available. Up to a theoretical 51 watts is available for a device, depending on the version of the standard in use and the vendor of the hardware.

Figure 2A:
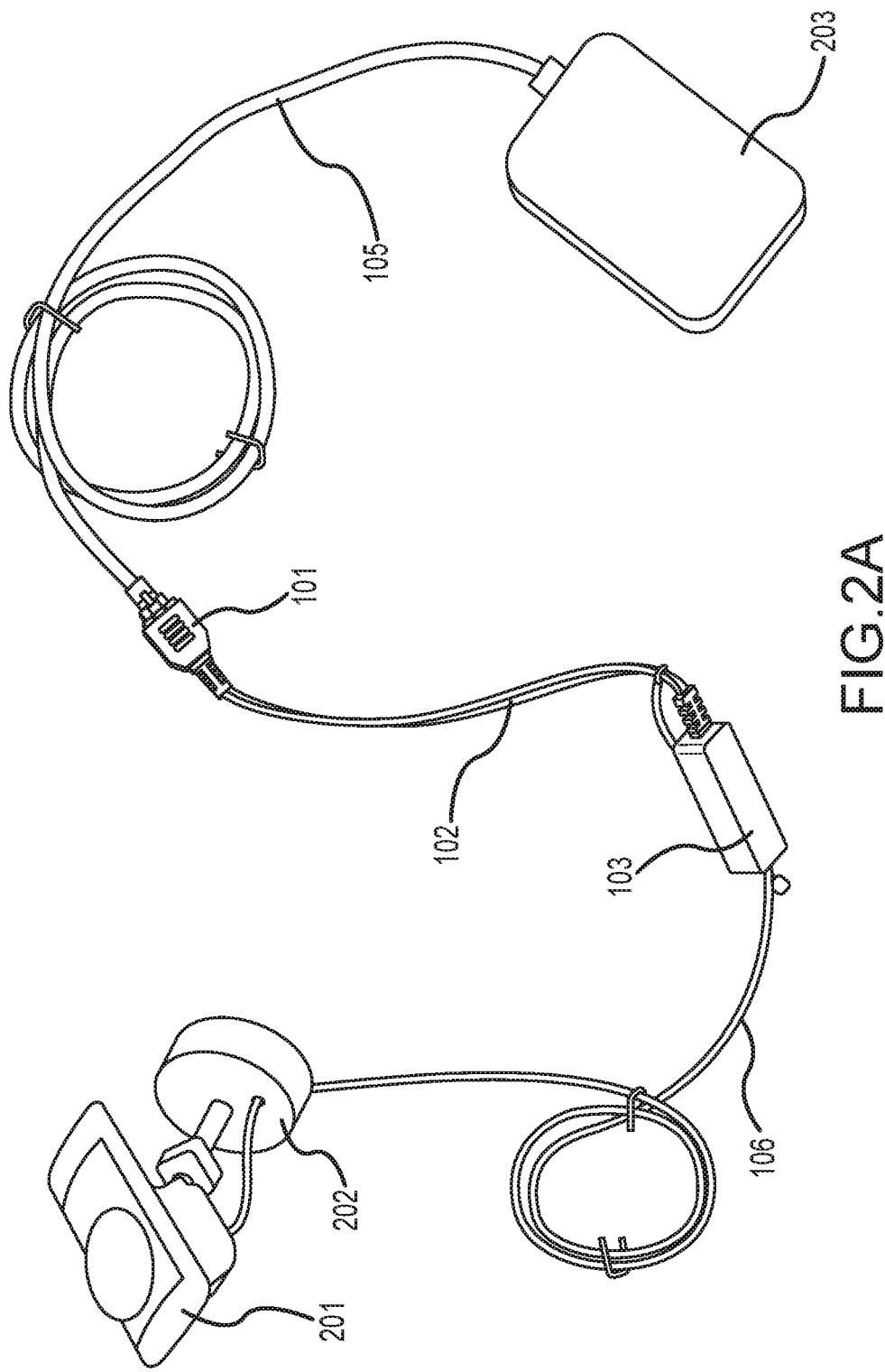
Figure 2C:
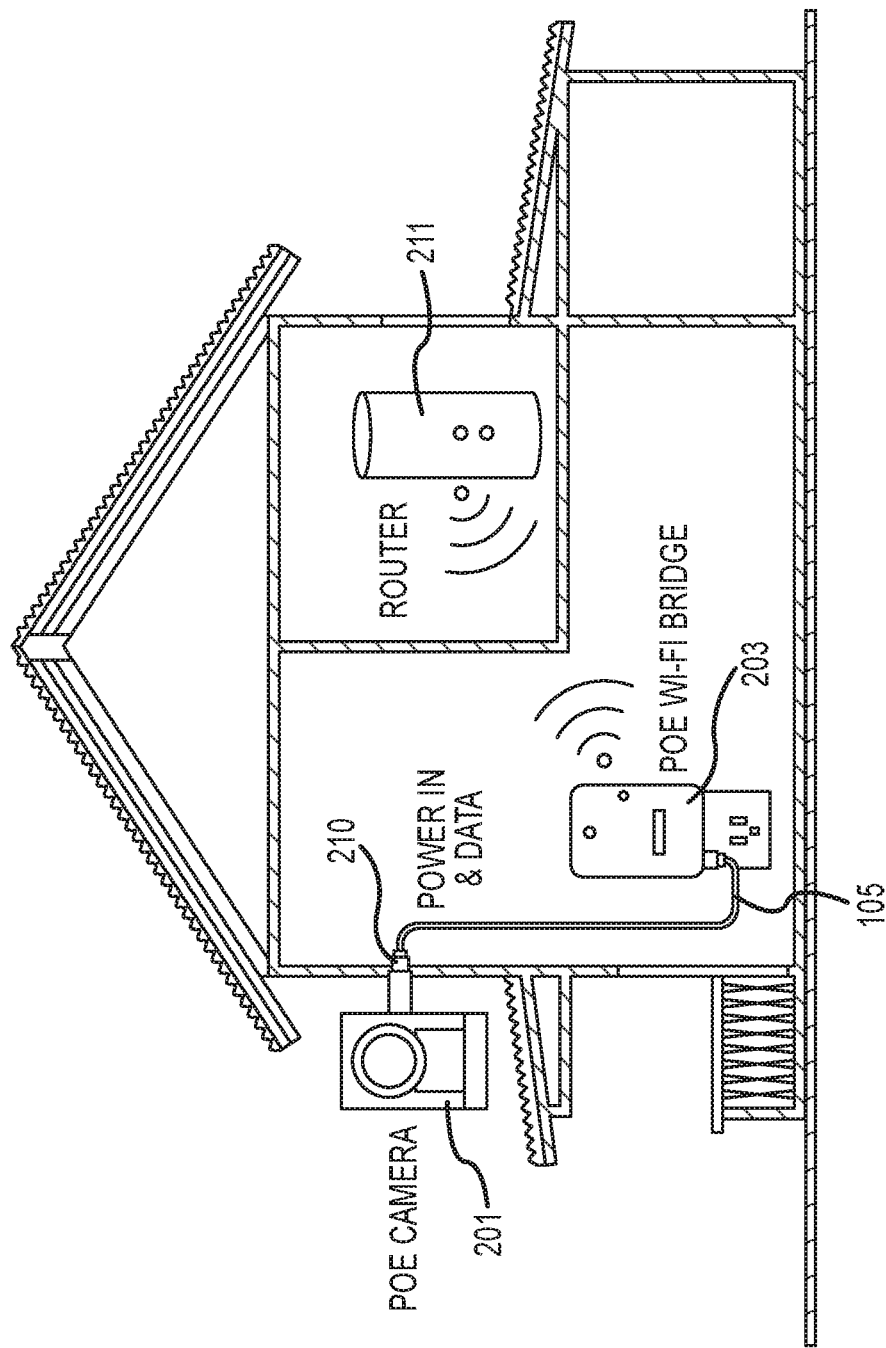
Figure 3B:
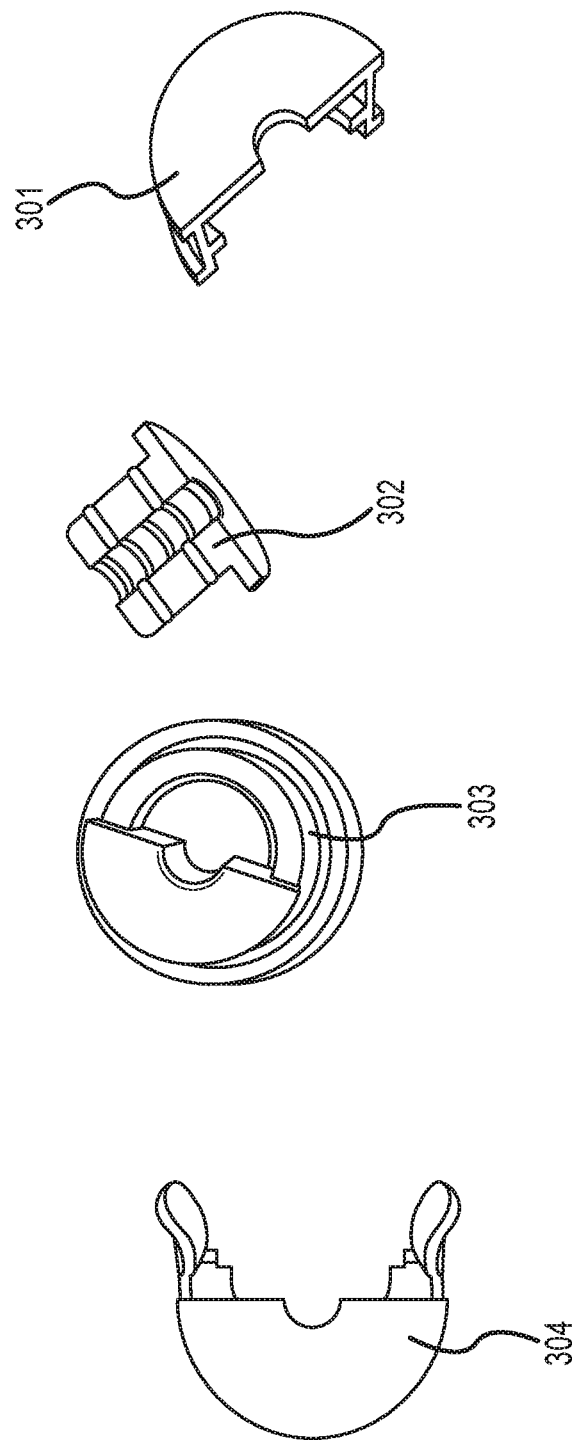
Figure 3C:
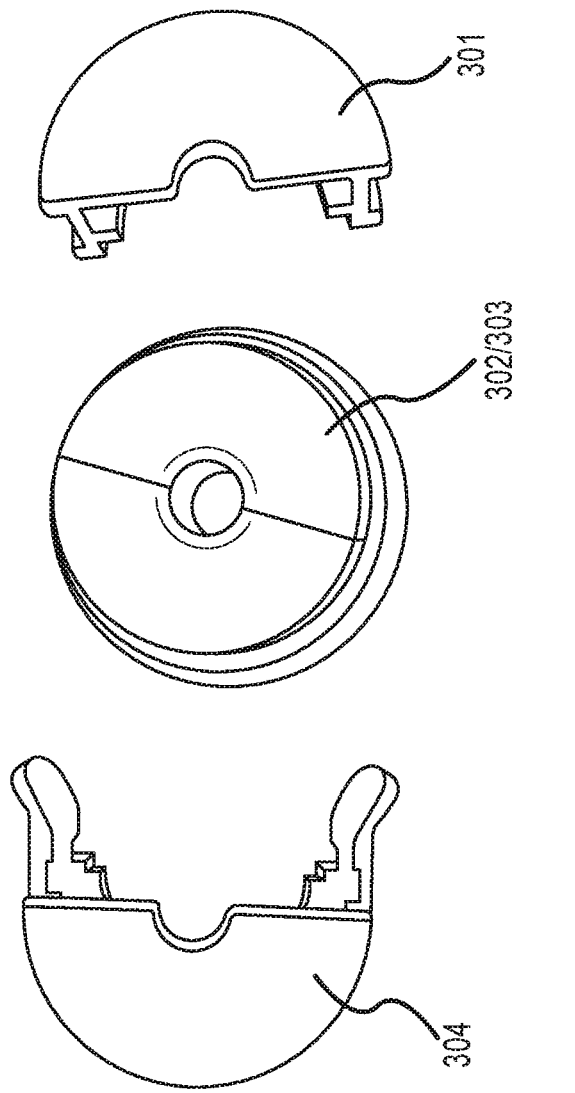
Figure 3D:
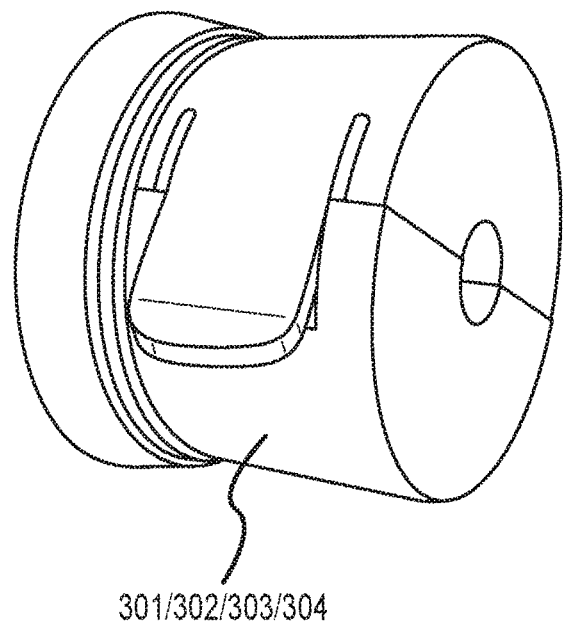
Figure 3E:
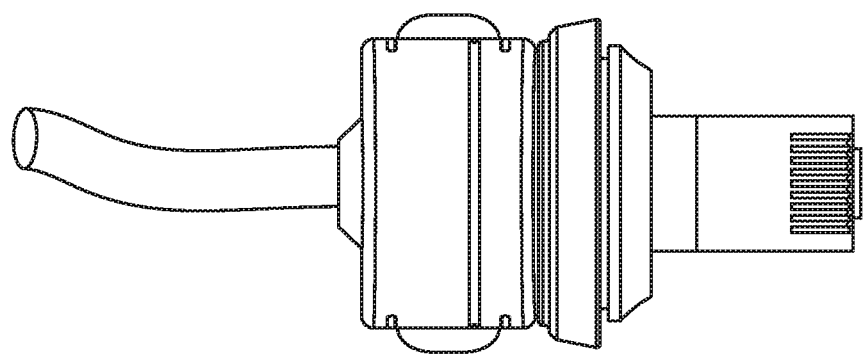
FIGS. 3E-3L show an additional exemplary stopper device useful in the home security camera system shown in FIGS. 2A-2C.
Figure 3F:
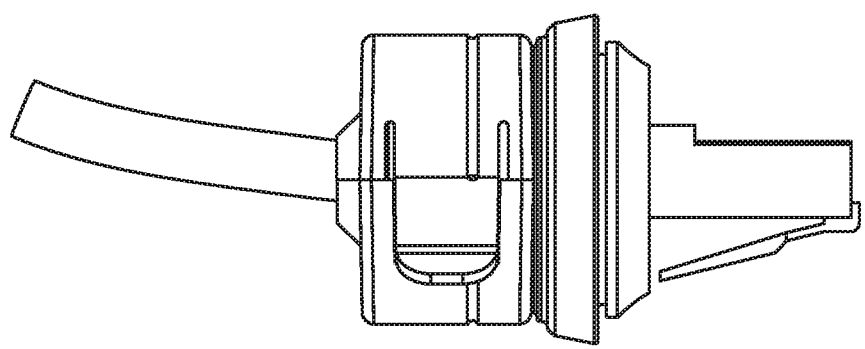
Figure 3G:
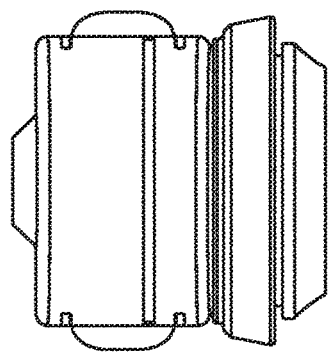
Figure 3H:
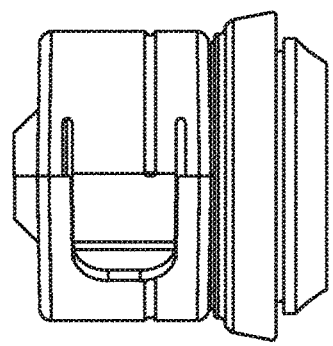
Figure 3I:
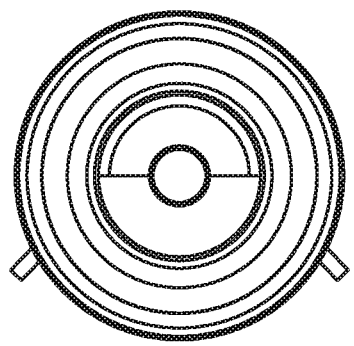
Figure 3J:
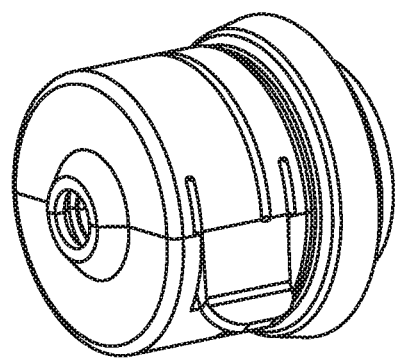
Figure 3K:
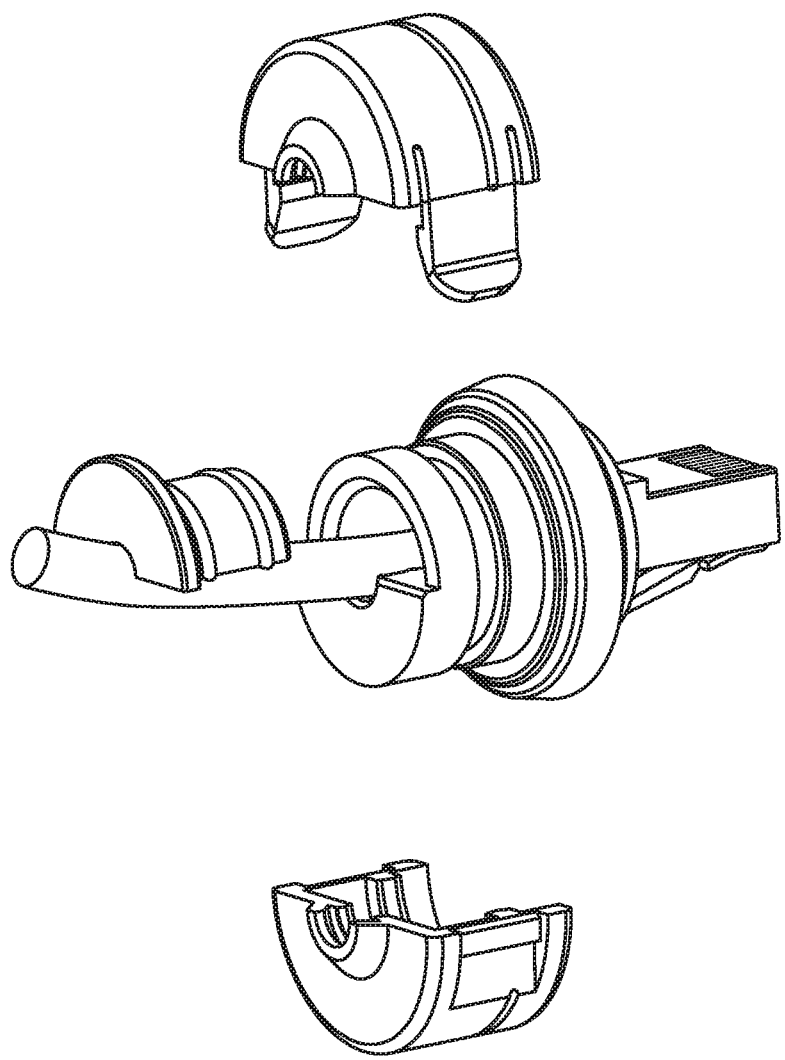
Figure 3L:
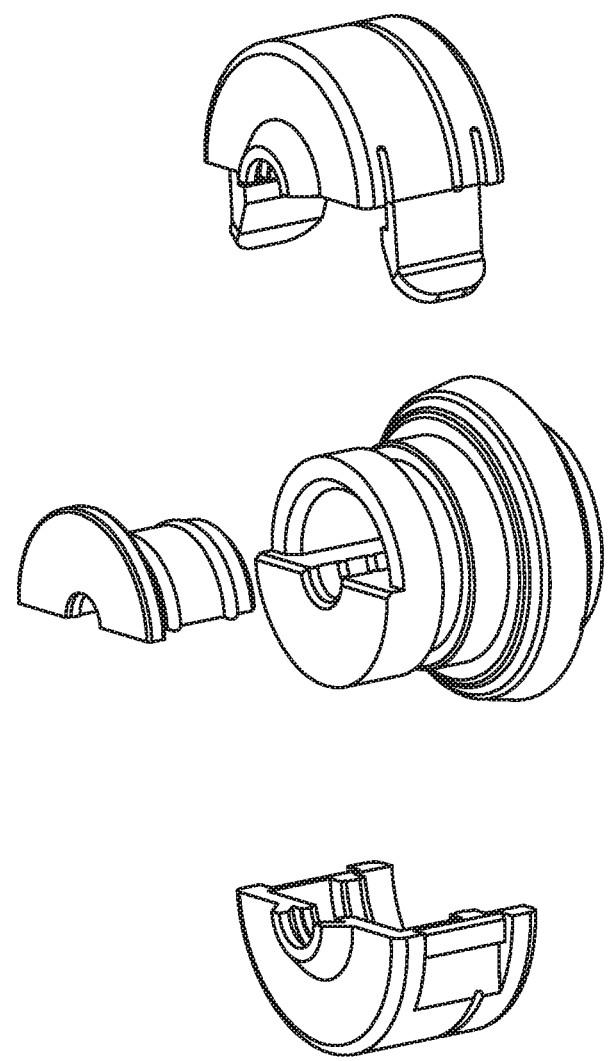

Referring now to FIGS. 2A-2C, the home security camera system is illustrated. The system includes camera 201, which may be mounted to the home using mounting and positioning apparatus 202. In some embodiments, camera 201 may be an IP camera. An Internet protocol (IP) camera may include a digital camera for capturing photos and/or video. IP cameras may send and receive data via a computer network or the Internet. IP cameras may be employed for any of a number of applications, such as surveillance, telecommunication, and social networking, just to name a few examples. Many such cameras for home security are known in the art, and thus the exact implementation of camera 201 is not intended to be limiting, and neither is its mounting and positioning apparatus, again, many configurations of which are known in the art.

First Ethernet cable 106 is the exterior Ethernet cable. It connects, at one end thereof, to the camera 201 using a stopper apparatus, described in greater detail below with regard to FIGS. 3A-3D. Cable 106 travels through the apparatus 202. It then connects, at the other end thereof, to the weather-proofing home exterior connection portion 103. The flat Ethernet cable portion 102 extends under an exterior window 210 of the house, thus allowing data and power connectivity to run from the interior of the house to the exterior of the house without the need to drill holes in the wall of the house, as would be required of a conventional circular cross-section Ethernet cable. At the interior of the house, home interior connection portion 101 of the flat Ethernet cable connects to the second Ethernet cable 105, at one end thereof.

At the other end thereof, the second Ethernet cable 105 connects to WiFi bridge 203. Network bridging is the action taken by network equipment to create an aggregate network from either two or more communication networks, or two or more network segments. Bridging is distinct from routing which allows the networks to communicate independently as separate networks. Also, if one or more segments of the network are wireless, it is known as wireless bridging. A network bridge is a network device that connects multiple network segments. WiFi bridge 203, as shown in FIG. 2C, plugs into an electrical outlet, and wirelessly communicates with the home's network via wireless router 211, thus providing both data and electrical connectivity to the second Ethernet cable 105, and henceforth onto camera 201 via flat cable portion 102 and first cable 106.

The foregoing-described system of FIGS. 2A-2C may be part of a broader wireless home security and/or home automation system. As is generally known in the art, wireless networks are typically advantageous over their wired counterparts, because they eliminate the need for stringing lengths of wire around a network site. This is especially useful in a home or enterprise security system in which multiple surveillance cameras and various sensors may be strategically placed around, both inside and outside, the home or office. Wireless networks further have the advantage that they cannot be easily circumvented by merely cutting the wired connections to network devices. One conventional technique for adding a new device to a home network requires user input to provide configuration information. For example, a user can purchase a wireless device that is, typically, initially configured as an access point (AP) device. The user can use their mobile device to identify this AP device on their WiFi network and enter a password. The wireless device/AP device requests configuration information from the user of the mobile device, for example, a home router network service set identifier "SSID" and password. The user provides the requested information through the mobile device using an appropriate application. The wireless device/AP device is rebooted as a client device. An association is then made and the IP device is coupled to the home network.

As initially noted above, in a preferred embodiment of the present disclosure, and as shown in connection with FIGS. 3A-3D, a stopper device allows removing the first Ethernet cable that comes with the camera and changing to different colors/lengths of the first Ethernet cable without having to install Ethernet connectors. The stopper includes portions 301, 302, 303, and 304. Portions 302 and 303 may be considered "interior" portions. Portion 303 is generally circular in cross-section, and includes a fully-open first end (circular opening) and a half-open second end (semi-circular opening). The closed portion of the semi-circular open also includes a semi-circular detent. Portion 302 inserts into the semi-circular opening, itself being semi-circular in cross-section, and includes a matching semi-circular detent, such that when portion 302 is inserted into portion 303, the semi-circular detents match-up to make a small, fully-circular opening that has about the diameter of a regular Ethernet cable, i.e. first Ethernet cable 106 (see FIG. 3C: "302/303" together). Portions 301 and 304 may be considered "exterior portions. They are both semi-circular in cross-section, closed at one end, open at the other. At the closed end, semi-circular detents are provided, such that when portions 301 and 304 are brought together, there is one fully-open circular end, and one closed circular end that has a small circular opening, again just large enough to allow first Ethernet cable 106 to pass therethrough. Portion 304 includes two wing connection portions along its length. Portion 301 includes two receptor detents along its length. When portions 301 and 304 are brought together, the wing connection portions of portion 304 insert into the receptor detents of portion 301, thus fastening the two said portions together. This connection of portions 301 and 304 is made so as to enclose the combined portions 302/303, as shown best in FIG. 3D ("301/302/303/304"). Such enclosure is made with the closed end of combined portions 302/303 being brought against the closed end of combined portions 301/304, and also with the open end of combined portions 302/303 being brought against the open end of combined portions 301/304 (see progression of FIG. 3C to FIG. 3D). First Ethernet cable connects, at one end thereof, to the camera 201 using the stopper apparatus 301/302/303/304 shown in FIG. 3D.

As initially noted above, in a preferred embodiment of the present disclosure, and as shown in connection with FIG. 4, the home security camera 201 may be mounted and installed in the vicinity of an exterior window 210 of the house using the hanger device 401. Hanger device 401 has a first "interior" end that is planar and extends in a first plane, a second "closure" end that is planar and extends in a second plane perpendicular to the first plane, and a third "exterior" end that is plan and extends in the first plane, parallel to the first interior end. When installed at an exterior window of the home, the first and third ends run parallel to and adjacent with the window rails or window panes. The second end is positioned between the window rail and the window jamb, and is preferable thin to allow closure of the window over the second end, as shown in FIG. 4. The mounting/positioning apparatus 202 connects with the third exterior end. The flat cable portion 202 runs through the hanger 401. That hanger 401 may be made of any suitable material, such as plastic, metal, or wood, among others.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment, it being understood that various changes may be made in the function and arrangement of elements described and methods of preparation in an exemplary embodiment without departing from the scope of the invention, which is set forth in the appended claims and their legal equivalents.

What is claimed is:

1. A security camera system comprising:
   an Internet protocol (IP) camera that is configured to receive electrical power and provide a digital data signal via an Ethernet connection;
   a mounting/positioning apparatus connected to the IP camera that physically connects the IP camera to a building structure at an exterior portion of the building structure;
   an exterior Ethernet cable, comprising a first male connection end and a second male connection end, which is connected to the IP camera at the first male connection end, and which runs through or along the mounting/positioning apparatus;
   a flat Ethernet cable that comprises:
      a first female connection end;
      a second female connection end, opposite the first female connection end, and comprising a weatherproofing clamshell enclosing the second female connection end; and
      a flat Ethernet cable portion disposed between the first female connection end and the second female connection end, wherein the flat Ethernet cable portion is characterized as having two parallel planar sides that are greater in dimension than a thickness of the flat Ethernet cable portion, and wherein the flat Ethernet cable is configured as a power over Ethernet (PoE) cable that is configured to carry electrical energy to the IP camera for operating image acquisition functions of the IP camera,
   wherein the second male connection end of the exterior Ethernet cable connects to the second female connection end of the flat Ethernet cable within the weatherproofing clamshell at the exterior portion of the building structure, and wherein the flat Ethernet cable runs through a closed window of the building structure between a rail portion and a jamb portion of the closed window of the building structure;
   an interior Ethernet cable, comprising a third male connection end and a fourth male connection end, which is connected to the first female connection end of the flat Ethernet cable at the third male connection end within an interior portion of the building structure;
   a WiFi bridge that is electrically connected to an interior power outlet of the building structure within the interior portion of the building structure and that is connected to the interior Ethernet cable at the fourth male connection end, wherein the digital data signal is configured to travel from the IP camera, through the exterior Ethernet cable, then through the flat Ethernet cable, then through the interior Ethernet cable, and then to WiFi bridge, and wherein the WiFi bridge receives the electrical energy from the interior power outlet; and
   a wireless router that wirelessly connects with the WiFi bridge that is configured to transmit the digital data signal between the wireless router and the WiFi bridge.

2. The system of claim 1, wherein the mounting/positioning apparatus connects to the closed window of the building structure with a hanger device.

3. The system of claim 1, wherein the exterior Ethernet cable connects to the IP camera with a stopper device.

4. A camera system comprising:
   a camera that is configured to provide a digital data signal via an Ethernet connection, wherein the camera is positioned exterior to a building structure;
   an exterior Ethernet cable, comprising a first male connection end and a second male connection end, which is connected to the camera at the first male connection end;
   a flat Ethernet cable that comprises:
      a first female connection end;
      a second female connection end, opposite the first female connection end; and
      a flat Ethernet cable portion disposed between the first female connection end and the second female connection end, wherein the flat Ethernet cable portion is characterized as having two parallel planar sides that are greater in dimension than a thickness of the flat Ethernet cable portion, wherein the flat Ethernet cable is disposed partially within the building structure and partially exterior to the building structure,
   wherein the second male connection end of the exterior Ethernet cable connects to the second female connection end of the flat Ethernet cable exterior to the building structure; and
   an interior Ethernet cable, comprising a third male connection end and a fourth male connection end, which is connected to the first female connection end of the flat Ethernet cable at the third male connection end within the building structure,
   wherein the digital data signal is configured to travel from the camera, through the exterior Ethernet cable, then through the flat Ethernet cable, and then through the interior Ethernet cable.

* * * * *